(12) United States Patent
Gause

(10) Patent No.: US 12,112,600 B2
(45) Date of Patent: Oct. 8, 2024

(54) METHOD AND SYSTEM FOR FACILITATING WAGER-BASED TRANSACTIONS FOR PRODUCTS OR SERVICES

(71) Applicant: Marshall Gause, Thornton, CO (US)

(72) Inventor: Marshall Gause, Thornton, CO (US)

(*) Notice: Subject to any disclaimer, the term of this patent is extended or adjusted under 35 U.S.C. 154(b) by 0 days.

(21) Appl. No.: 18/406,125

(22) Filed: Jan. 6, 2024

(65) Prior Publication Data

US 2024/0290171 A1 Aug. 29, 2024

Related U.S. Application Data

(63) Continuation-in-part of application No. 18/115,168, filed on Feb. 28, 2023, now abandoned.

(51) Int. Cl.
*G07F 17/32* (2006.01)
*G06Q 30/0207* (2023.01)
*G06Q 50/34* (2012.01)

(52) U.S. Cl.
CPC ..... *G07F 17/3255* (2013.01); *G06Q 30/0209* (2013.01); *G06Q 50/34* (2013.01); *G07F 17/3211* (2013.01); *G07F 17/323* (2013.01); *G07F 17/3241* (2013.01); *G07F 17/3288* (2013.01); *G06Q 2220/00* (2013.01)

(58) Field of Classification Search
CPC .............................. G07F 17/3288; G06Q 50/34
See application file for complete search history.

(56) References Cited

U.S. PATENT DOCUMENTS

| | | | | |
|---|---|---|---|---|
| 7,780,522 | B2* | 8/2010 | Lutnick | G07F 17/3241 463/25 |
| 2008/0207296 | A1* | 8/2008 | Lutnick | G07F 17/3255 463/16 |
| 2012/0115554 | A1* | 5/2012 | Cairns | G07F 17/3288 463/25 |
| 2012/0329544 | A1* | 12/2012 | Rubinsky | G06Q 40/04 463/18 |
| 2013/0073389 | A1* | 3/2013 | Heath | G06Q 30/02 705/14.54 |
| 2013/0339112 | A1* | 12/2013 | Palexas | G06Q 30/0209 705/14.12 |
| 2014/0143146 | A1* | 5/2014 | Passanha | G06Q 20/385 705/44 |
| 2015/0072765 | A1* | 3/2015 | Amaitis | G07F 17/3288 463/25 |
| 2019/0362601 | A1* | 11/2019 | Kline | G07F 17/3223 |

(Continued)

*Primary Examiner* — Chase E Leichliter

(57) ABSTRACT

An electronic sports wagering exchange system to facilitating a wager-based transaction for a plurality of products or services. The system receives a wager from a user for a predetermined event through a sports betting module. The system maintains a pricing data and an availability data for each of the plurality of products or services using an inventory tracking module. The system receives a purchase order for one or more products or services from the plurality of products or services via an order processing module. The system adjusts a purchase price through the order processing module for the purchase order based on an outcome of the wager. The system dynamically determines a value of a discount or coupon through an odds calculation module based on a plurality of evolving betting odds and a potential payout of the wager.

19 Claims, 5 Drawing Sheets

(56) References Cited

U.S. PATENT DOCUMENTS

| | | | |
|---|---|---|---|
| 2020/0043034 A1* | 2/2020 | Arenson | G06Q 30/0222 |
| 2021/0272415 A1* | 9/2021 | Huke | G06Q 30/0241 |
| 2022/0193557 A1* | 6/2022 | Higgins | G06Q 20/30 |
| 2022/0198871 A1* | 6/2022 | Huke | G07F 17/3288 |

* cited by examiner

300

SPORTS WAGERING EXCHANGE

| Product 1 | Product Retail Value | | | | | | | | |
|---|---|---|---|---|---|---|---|---|---|
| SAMSUNG SMARTPHONE | $1,000 | | MAIN TEAM Packers | | | | | | |

| Event Date | Opposing Team | WIN % Probability | Amount Bettor Places / Wagers | Points Bettor Takes or Gives | Coupon / Rebate for Go Bettor Receives if Win | Amount of Coupon / Discount Bettor Recieves for Product Purch if Bettor Loss | Amount of Coupon / Discount Bettor Recieves for Placing wager | Wager Offered By: | Total Coupon To Bettor if 1) Order Placed, 2) order executed & 3) Bettor loses |
|---|---|---|---|---|---|---|---|---|---|
| 10/1/23 | Bears | 15% | $150 | -1.0 | $550 | 20% | 5% | Amazon | 25% |
| 10/1/23 | Bears | 10% | $100 | -5.0 | $900 | 20% | 10% | Amazon | 30% |
| 10/8/23 | Lions | 50% | $500 | 2.0 | $500 | 15% | 5% | Samsung | 20% |
| 10/8/23 | Lions | 40% | $400 | -3.0 | $500 | 15% | 10% | Samsung | 25% |

FIG. 3

METHOD AND SYSTEM FOR FACILITATING WAGER-BASED TRANSACTIONS FOR PRODUCTS OR SERVICES

RELATED APPLICATION

This application is a Continuation-in-Part and claims priority to U.S. patent application Ser. No. 18/115,168, filed on Feb. 28, 2023, which is hereby incorporated by reference as if set forth in its entirety herein.

FIELD OF THE INVENTION

The present invention relates generally to electronic sports wagering systems, and more particularly to systems that facilitate wager-based transactions for a variety of products or services.

DESCRIPTION OF THE RELATED ART

The inclination of humans to engage in and enjoy gambling has been known to exist since prehistoric times. During various periods in the history of the United States, gambling was treated as less than desired social conduct that needed to be curbed or restricted. The application of such governmental gambling restrictions grew in the late nineteenth/early twentieth century when the widespread proliferation of new gaming devices, such as the slot machine, heightened the interest and participation of both the public and the criminal underworld in gambling.

In recent years, however, there has been a renewed interest by the public in gambling activities, followed by a nationwide trend by numerous governmental entities to reduce gambling restrictions to the point of actually legalizing various forms of gambling to provide badly needed taxable revenue and economic stimulus. Further, with the creation of the Internet and the gambling offerings provided by it, the public's interest in new and old forms of gambling has increased substantially.

One of the forms of gambling that the public and their respective government entities have been interested in is that of pool-based gambling. In this form of gambling, all the wagers are generally placed into a common wager pool with the winners of that gambling activity generally being paid out from that common wager pool. Of all the forms of pool-based gambling, pari-mutuel gambling may be generally considered to be the best known and successful.

U.S. Pat. Nos. 6,416,408; 6,648,753 and 6,692,354 describe several group betting games where the participants make a first bet on a first game and a second bet on the result of a second group game. The result of the second group game is determined first, but it is only applied if the first game is a winner. Therefore, a round of "bonus" game is provided to the winners of the first game.

US 2020/0043034 A1 introduces a sports betting module, it is imperative to recognize the nuanced differentiators embedded within the claimed invention. The presently claimed invention surpasses the scope of US 2020/0043034 A1 by facilitating wagers across a diverse spectrum of measurable events. This includes not only gaming activities and sporting events but extends to encompass gambling activities, financial market conditions, and various other measurable occurrences. Additionally, the inventory tracking module builds upon the foundation laid by US 2020/0043034 A1, introducing a substantial evolution in the wager-based transaction process. While the prior art acknowledges an inventory management tool linked to a user's account, the claimed invention's inventory tracking module transcends mere inventory management. It functions as an integral system component, maintaining real-time pricing and availability data for products and services offered by multiple merchants. This real-time tracking ensures that users receive accurate and up-to-date information, mitigating the risk of order cancellations due to unavailability. This represents a significant improvement over systems like US 2020/0043034 A1, where immediate and precise inventory information may not be readily available. For instance, consider a user linking a wager to a purchase order for a specific product. The real-time inventory tracking module in the claimed invention promptly verifies product availability, offering immediate feedback to the user. Such responsiveness and accuracy stand as notable advancements over prior art systems.

The order processing module in the claimed invention and US 2020/0043034 A1 both emphasize the linkage between purchase orders and sports bets. However, the claimed order processing module introduces unique features absent in the prior art. Notably, it adjusts purchase prices based on wager outcomes, a feature absent in US 2020/0043034 A1. The claimed invention's handling of potential payouts sets it apart; unlike US 2020/0043034 A1, which only provides a discount for winning wagers, the claimed invention converts potential payouts into discounts or coupons, presenting a comprehensive and user-friendly approach to wager-based transactions.

Furthermore, the claimed invention considers merchant preferences for all outcomes, a crucial aspect not addressed by US 2020/0043034 A1. By accommodating merchant preferences, the claimed invention ensures a balanced and mutually beneficial transaction process. This adaptability makes the claimed invention more versatile compared to the prior art, where such considerations may be lacking.

The industry is continuously looking for ways to generate group interest and excitement in the game experience. The present invention provides a unique feature and an associated system in this regard. It is a new type of application that works in a similar way as a betting application works. It provides an online interface where a group or individual users can join the private room, online application, or web page and bet on any live game. It is primarily a sport wagering exchange in which the participants can post standardized sports wagers-opposed to the current practice of only a central professional bookmaker who posts the odds and percentages to which the wager participants are only allowed to accept. In addition to being allowed to post markets, the participants can also participate in social media display of information, chats, goods and services wagers, wagers placed via cryptocurrency, and foreign currencies, and have a range of standardized order types to choose.

None of the previous inventions and patents, taken either singly or in combination, is seen to describe the instant invention as claimed. Hence, the inventor of the present invention proposes to resolve and surmount existent technical difficulties to eliminate the aforementioned shortcomings of prior art.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

The objective of the invention is to provide an improved system and procedure which provides a betting application with enhanced functionalities.

More specifically, it is the principal object of this invention to provide a virtual environment system that is both interactive, and responsive to a user's prompting by any one of a number of commands or input and provides various types of output to the users.

It is also the objective of the system to provide a system where a decentralized environment allows many participants to place and accept wagers from many market participants-opposed to accepting only the wagers offered by one or a few primarily professional bookmakers.

It is also a feature of the invention to provide an application where a centralized exchange and clearing of wagers process is provided.

It is also the objective of the invention to provide a methodology where participant bettors can place orders at different wager (price) points.

It is a further objective of the invention to provide an option where participant bettors can direct orders to a particular cross-participant.

It is also the objective of the invention to allow participant bettors to be able to see 'the order book', that is the various wagers placed up and down from the current market.

It is a further objective of the invention to provide an online application where participants may be able to see participant social identifiers and or geographic locations and/or sports fan affiliations.

According to another aspect of the invention, the participant bettors may be able to receive compensation and/or rebates for providing orders.

It is also the objective of the invention to allow a chat or otherwise communication function, including virtual.

It is moreover the objective of the invention to provide an interface allowing exchange for settlement in cryptocurrencies.

It is a further objective of the invention to allow auto cancel and or widen orders and payout percentages feature—at key places exchange may employ and or utilize a cancel feature to orders or auto-cancel feature type order.

It is also the objective of the invention to accept many other exchange participants.

It is still another objective of the invention to provide an interface wherein participants may place orders away from the market.

It is also the objective of the invention to provide an environment where participants may receive wager compensation from placing an order significantly away from the inside market and then having that order executed.

It is another objective of the invention to allow participants to specify payout ratios.

It is a further objective of the invention to order book may be organized by inside odds first then payout percentage next or user custom sort, for example by odds, professional orders, customer orders, order size, payout ratios, team affiliations, or opposing win percentage data.

It is also the objective of the invention to Order book is structured to show the size available at different wager levels depending on the order type used for placing the wager.

It is also the objective of the invention to allow different wager order types, for example, may include but not limited to, market orders, limit orders, stop orders, iceberg orders, market-if-touched orders, all or none orders, immediate or cancel orders, fill or kill orders, good till canceled orders, day orders, take profit orders, one cancels the other order, one sends other orders, tick sensitive orders, spread orders, at the opening orders, at half-time or period orders.

It is also the objective of the invention to allow the acceptance of orders in different currencies.

It is also the objective of the invention to allow settlements in credits or rebates.

It is also the objective of the invention to allow settlement against a brokerage account.

It is another objective of the invention to allow for wagers with credit terms established or other guarantees It is another objective of the invention to allow exchange which may allow order type where the winner or loser pays the entire commission.

It is another objective of the invention to allow for use of a central clearing margin system.

It is another objective of the invention to allow to pay commissions to representatives, brokers, betting systems, and automatic betting systems.

It is another objective of the invention to allow for the collection and selling of sports market data.

It is another objective of the invention to allow for setting up a broker system and payment therewith.

It is another objective of the invention to offer a barter of goods or services for winning or losing a bet, for example, to mow a lawn or offer the car, a food item or offer an hour of consultation. For example, a food item offered by a fast-food restaurant: for a $1 wager the participant could receive a bundled food package worth $7 if a football team scores one touchdown in the next quarter.

It is another objective of the invention to offer a reputation gauge system and algorithm to assess player credibility and reputation.

It is another objective of the invention to offer a bond or surety type system to ensure the satisfaction of a good or service type wager.

It is another objective of the invention to offer other companies to offer or market a promotion if a data point is met.

It is another objective of the invention to offer a process or system for social or photographic/video/virtual proof of wager satisfaction/settlement.

It is another objective of the invention to allow the employ the use of standardized wagers across platforms.

It is another objective of the invention to allow options on sports wagers for example, the over points on tonight's titans vs. packer's game is 41 points-a call option struck at 41 would allow the purchaser to receive a digital payout if they purchase that option or sell that option, collecting or paying a premium.

Other aspects, advantages and novel features of the present invention will become apparent from the detailed description of the invention when considered in conjunction with the accompanying drawings.

It is another objective of the exchange to calculate individual win percentage data, allow users to display such data and allow other participants to wager alongside the same bettor anonymously or knowingly to the primary bettor. With the exchange receiving a percentage and the primary bettor receiving a percentage of the winnings either knowingly or unknowingly at the time of the wager(s) or later for example after a sports season has concluded or some other pre-determined time point.

It is another objective of the exchange to allow bettors to enter negotiated multi-game wagers directed to a specific cross-party counterparty, for example, a directed cross-party wager in which party A agrees to a lower odd of game 1 in exchange for greater odds in game 2 or 3 for example.

Is melt another objective of the exchange to allow bettors to meet, socialize and wager in a virtual format if they choose.

In one aspect, the present disclosure provides an electronic sports wagering exchange system. The electronic sports wagering exchange system includes a processor and a memory. The memory is coupled to the processor. The memory is used to store instructions. The instructions in the memory when executed by the processor cause the processor to perform a method. The processor performs the method for facilitating a wager-based transaction for a plurality of products or services. The method includes a step of receiving a wager from a user for a predetermined event through a sports betting module. The predetermined event includes a gaming activity, a gambling activity, a sporting event, a financial market condition, one or more other measurable events, and the like. Further, the method includes another step of maintaining a pricing data and an availability data through an inventory tracking module for each of the plurality of products or services offered by a plurality of merchants. The method includes yet another step of receiving a purchase order through an order processing module for one or more products or services from the plurality of products or services. The purchase order is linked to the wager placed by the user or on behalf of the user. Going further, the method includes yet another step of adjusting a purchase price for the purchase order through the order processing module based on an outcome of the wager. The order processing module converts a potential payout of the wager into a discount or coupon applicable to the purchase order if the outcome of the wager is a winning bet. The order processing module applies the discount or coupon to the purchase order to reduce the purchase price. The method includes yet another step of dynamically determining a value of the discount or coupon through an odds calculation module based on a plurality of evolving betting odds and the potential payout of the wager.

In an embodiment of the present disclosure, the sports betting module may be configured to structure the wager as a parlay having a-plurality of betting conditions. The order processing module provides a large discount or coupon value when more betting conditions of the parlay are met.

In an embodiment of the present disclosure, the electronic sports wagering exchange system may include a coupon trading module configured to enable the user to sell or trade the discount or coupon resulting from the winning bet.

In an embodiment of the present disclosure, the order processing module is configured to facilitate application of discounts to the purchase order linked to a losing bet based on preferences of the plurality of merchants.

In an embodiment of the present disclosure, the sports betting module is configured to enable the user to search and view available bets on the predetermined event in a database. The sports betting module allows the user to place, accept, change, and settle bets in the database.

In an embodiment of the present disclosure, the order processing module is configured to allow the user to place the purchase order linked to the wager at different wager points. The order processing module allow the user to direct the purchase order linked to the wager to a specific merchant from the plurality of merchants. The order processing module allows the user to place the purchase order linked to the wager away from current market conditions. The order processing module processes various order types linked to different bet types including but not limited to moneyline, spread, prop bet, parlay, and over/under bet types.

In an embodiment of the present disclosure, the sports betting module facilitates bet placement, acceptance, changing, and settlement functions between two or more users according to bet conditions established in the database.

In an embodiment of the present disclosure, the order processing module allows the user to search, view, and dynamically link available purchase orders to a plurality of bet types offered by the sports betting module.

In an embodiment of the present disclosure, the order processing module allows the user to search, view, and dynamically link available purchase orders to a plurality of bet types offered by the sports betting module.

In another aspect, the present disclosure provides a method for facilitating the wager-based transaction for the plurality of products or services. The method includes a step of receiving the wager from the user for the predetermined event through the sports betting module. The predetermined event includes the gaming activity, the gambling activity, the sporting event, the financial market condition, or the one or more other measurable events. Further, the method includes another step of maintaining the pricing data and the availability data for each of the plurality of products or services offered by the plurality of merchants using the inventory tracking module. The method includes yet another step of receiving the purchase order through the order processing module for the one or more products or services from the plurality of products or services. The purchase order is linked to the wager placed by the user. Going further, the method includes yet another step of determining by the order processing module the outcome of the wager as the winning bet or the losing bet. The method includes yet another step of adjusting the purchase price through the order processing module for the purchase order based on the outcome of the wager. The order processing module converts the potential payout of the wager into the discount or coupon applicable tot eh purchase order of the wager is the winning bet. The order processing module applies the discount or coupon to the purchase order to reduce the purchase price. Furthermore, the method includes yet another step of dynamically determining the value of the discount or coupon through the odds calculation module based on the plurality of evolving betting odds and the potential payout of the wager.

In yet another aspect, the present disclosure provides a computer-readable storage medium. The computer-readable storage medium enables encoding of computer executable instructions. The computer executable instructions when executed by at least one processor perform a method. The at least one processor performs the method for facilitating the wager-based transaction for the plurality of products or services. The method includes a step of receiving the wager from the user for the predetermined event through the sports betting module. The predetermined event includes the gaming activity, the gambling activity, the sporting event, the financial market condition, or the one or more other measurable events. Further, the method includes another step of maintaining the pricing data and the availability data for each of the plurality of products or services offered by the plurality of merchants using the inventory tracking module. The method includes yet another step of receiving the purchase order through the order processing module for the one or more products or services from the plurality of products or services. The purchase order is linked to the wager placed by the user. Going further, the method includes yet another step of determining by the order processing module the outcome of the wager as the winning bet or the losing bet. The method includes yet another step of adjusting the purchase price through the order processing module for the purchase order based on the outcome of the wager. The order processing module converts the potential payout of the wager into the discount or coupon applicable tot eh purchase order of the wager is the winning bet. The order processing module applies the discount or coupon to the purchase order to reduce the purchase price. Furthermore, the method includes yet another step of dynamically determining the value of the discount or coupon through the odds calculation module based on the plurality of evolving betting odds and the potential payout of the wager.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 illustrates an exemplary electronic sports wagering exchange of a purchase order, in accordance with various embodiments of the present disclosure.

Figure 1A:
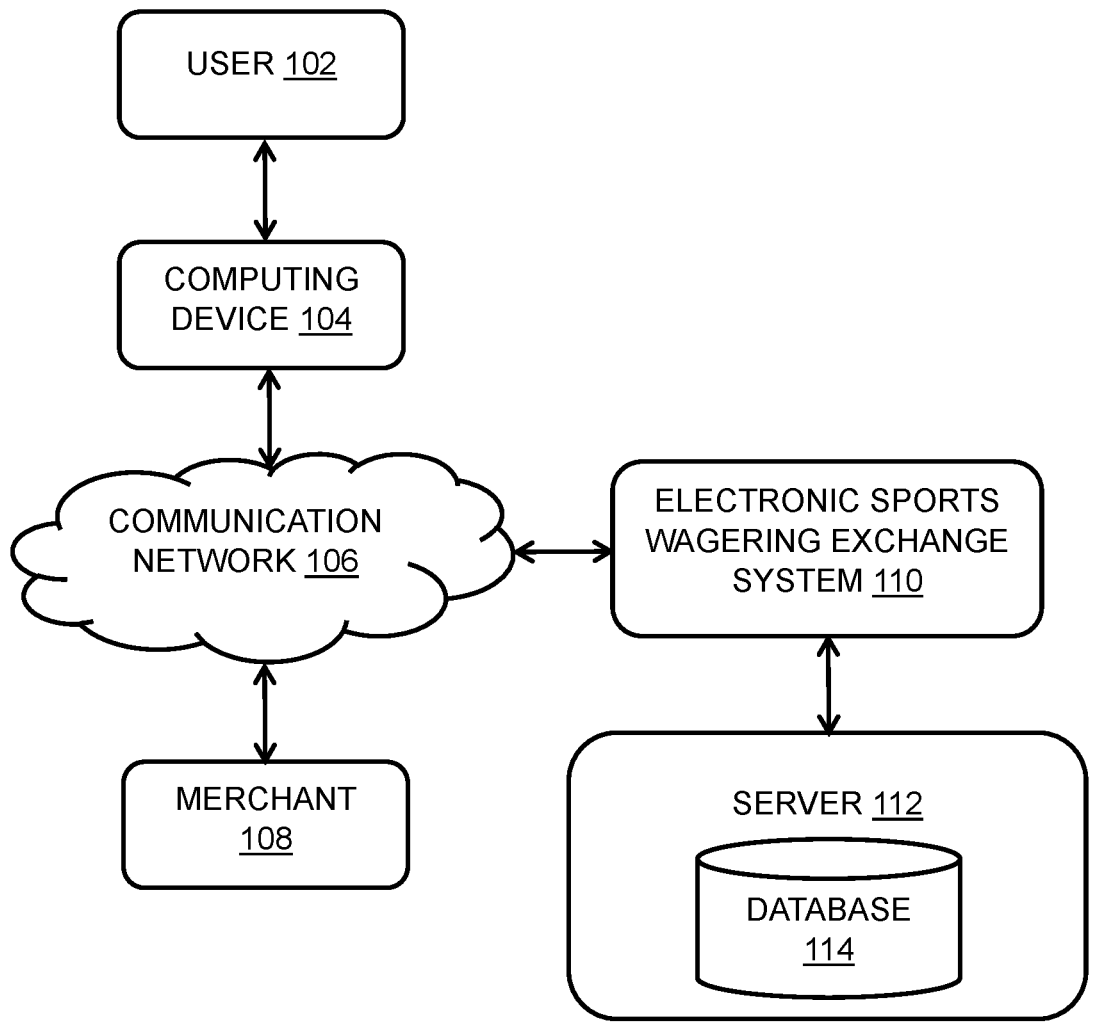
FIGS. 1A and 1B illustrate an electronic sports wagering exchange environment for facilitating a wager-based transaction for a plurality of products or services, in accordance with various embodiments of the present disclosure.

The apparatus and method components have been represented where appropriate by conventional symbols in the drawings, showing only those specific details.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The present invention is directed to an application that presents an advancement in Wagering applications. The present invention comprises a novel and innovative product and service of a Sports Wagering Exchange. It is primarily a sport wagering exchange in which the participants can post standardized sports wagers-opposed to the current options of only a central professional bookmaker who posts the odds and percentages to which the wager participants are only allowed to accept. It is also a centralized exchange in which participants receive coupons or rebates to be used for the purchase of goods or services and in which losing wagers also receive coupon or rebate on goods or services.

In addition to being allowed to post markets, the participants may also participate in social media displays of information, chats, goods and services wagers, wagers placed via cryptocurrency, and foreign currencies, and have a range of standardized order types to choose from. Also, standardized wagers from other wagering companies may be posted as a market on the exchange so much that the Sports Wagering Exchange serves also as a centralized market serving liquidity, goods or services available, best price available, and clearing functionally.

The invention is based on components of an exemplary environment in which the invention may be used. The online system has focused components and is based on simple to use. The software can be viewed and used from a smartwatch device worn by the subject. In order to use the application, the user has to be connected to the internet to use the services in real-time. The real-time utility needs to be connected to the internet through local area networks ("LANs")/wide area networks ("WANs"), wireless networks, or independent internet sources. Further, the internet would connect the user to the online application server, through the user's computing or mobile device, where applicable.

Generally, the client device may include virtually any computing device capable of receiving and sending a message over a network, such as LAN/WAN or independent network, wireless network, and the like, to and from another computing device, such as a server or mobile device, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smartphones, Tablets or PDAs. Similarly, the client device may be any device that is capable of connecting using a wired or wireless communication medium such as a PDA, POCKET PC, wearable computer, and any other device that is equipped to communicate over a wired and/or wireless communication medium.

The user's device may include a browser application that is configured to receive and to send web pages, web-based messages, and the like. The browser application may be configured to receive and display graphics, text, multimedia, and the like, employing virtually any web-based language, including Standard Generalized Markup Language (SMGL), Hypertext Markup Language (HTML), and so forth.

The system is designed to have two ends. One is the front end which is designed as the front panel with GUI for taking the user's input and displaying various types of outputs and the second one is the back end which is the cloud-based server. All information entered is stored, processed and evaluated in the database server according to the given format. The same database allows successful evaluation and withdrawal of information.

The system as per its preferred embodiments presents an interface allowing the user to sign up at the designated platform. Once the user signups up, he/she can join the sporting events and can post standardized sports wagers. The invention and its various embodiments and protocols could also encompass a wide number of sporting events for both individual and team sports, including, but not limited to, football, baseball, hockey, basketball, swimming, tennis, auto racing, motorcycle racing, bicycle racing, golf, bowling, rodeo, Olympic events, Australian football, soccer/football, rugby, cricket, billiards, pool, and the like. The invention could focus on wagering upon the final winning conclusion (e.g., the final winning score) of a particular sports event, contest, game or the like (e.g., a professional football game, etc.) as well as include wagering on the outcome of various sub-events (e.g., a pre-final score; the occurrence of certain maneuvers, a certain player's game performance, etc.) that may or may not occur during the wagered upon the sporting event.

As per its additional embodiments, the user can watch the game live or can choose a third-party platform to watch the game. The user can also log out from the third-party platform and can view live game stats while logged at the application interface. Each user can either suggest a new bet or chooses one of the suggested bets.

As per its further embodiments, the decentralized environment allows multiple participants to place and accept wagers from many market participants. The participants can exchange and clear of wagers process. The participant bettors can place orders at different wager (price) points. The bettors can direct order to a particular cross-participant.

As per further embodiments, the participant bettors may be able see 'the order book', that is the various wagers placed up and down from the current market and further may be able to see participant social identifiers and or geographic locations and/or sports fan afflictions.

The system as per its further embodiments allows a chat or otherwise communication function, including a virtual interface. The system as per its additional embodiments may accept many other exchange participants. The Participants may place orders away from the market and may receive wager compensation for placing an order significantly away from the inside market and then having that order executed.

The system as per its additional embodiments provides auto cancel and or widen orders and payout percentages feature—at key places exchanges may employ and or utilize a cancel feature to orders or auto-cancel feature type orders.

The system as per its further embodiments provides participants the option to specify payout ratios. The Order book may be organized by inside odds first then payout percentage next. Furthermore, the order book is structured to show the size available at different wager levels depending on the order type used for placing the wager. It allows different wager order types, for example, may include but not limited to, market orders, limit orders, stop orders, iceberg orders, market-if-touched orders, all or none orders, immediate or cancel orders, fill or kill orders, good till canceled orders, day orders, take profit orders, one cancels the other order, one sends other orders, tick sensitive orders, spread orders, at the opening orders, at half-time or period orders.

The system as per its further embodiments offers a reputation gauge system and algorithm to assess player credibility and reputation. It can further offer a bond or surety type system to ensure the satisfaction of a good or service type wager.

The financial transactions among participants may involve receiving compensation and/or rebates for providing orders. The system also supports the exchange for settlement in cryptocurrencies and every type of other paper currency. The system further supports credits or rebates. It can also provide settlements against a brokerage account and may allow for wagers with credit terms established or other guarantees. The exchange may allow an order type where the winner or loser pays the entire commission and further allow for use of a central clearing margin system.

The system as per its further embodiments may support a barter of goods or services for winning or losing a bet, for example, to mow a lawn or offer a car, a food item or offer an hour of consultation. For example, a food item offered by a fast-food restaurant: for a $1 wager the participant could receive a bundled food package worth $7 if a football team scores one touchdown in the next quarter.

The system as per its additional embodiments may involve options on sports wagers—for example, the OVER points on tonight's Titans vs. Packers game is 41 points—a call option struck at 41 would allow the purchaser to receive a digital payout if they purchase that option.

The system as per its further embodiments allows paying commissions to representatives, brokers, betting systems, and automatic betting systems and further allows for the collection and selling of sports market data. The exchange may allow for setting up a broker system and payment therewith.

The system as per its further embodiments may offer other companies to offer or market a promotion if a data point is met. This may involve a process or system for social, virtual or photographic/video proof of wager satisfaction/settlement. The Sports Wagering Exchange employs the use of standardized wagers across platforms.

While a specific embodiment has been shown and described, many variations are possible. With time, additional features may be employed. The particular shape or configuration of the platform or the interior configuration may be changed to suit the system or equipment with which it is used.

It is another objective of the exchange to calculate individual win percentage data, allow users to display such data and allow other participants to wager alongside the same bettor anonymously or knowingly to the primary bettor. With the exchange receiving a percentage and the primary bettor receiving a percentage of the winnings either knowingly or unknowingly at the time of the wager(s) or later for example after a sports season has concluded or some other pre-determined time point.

It is another objective of the exchange to allow bettors to enter negotiated multi-game wagers directed to a specific cross-party counterparty, for example, a directed cross-party wager in which party A agrees to a lower odd of game 1 in exchange for greater odds in game 2 or game 3 for example.

Figure 1B:
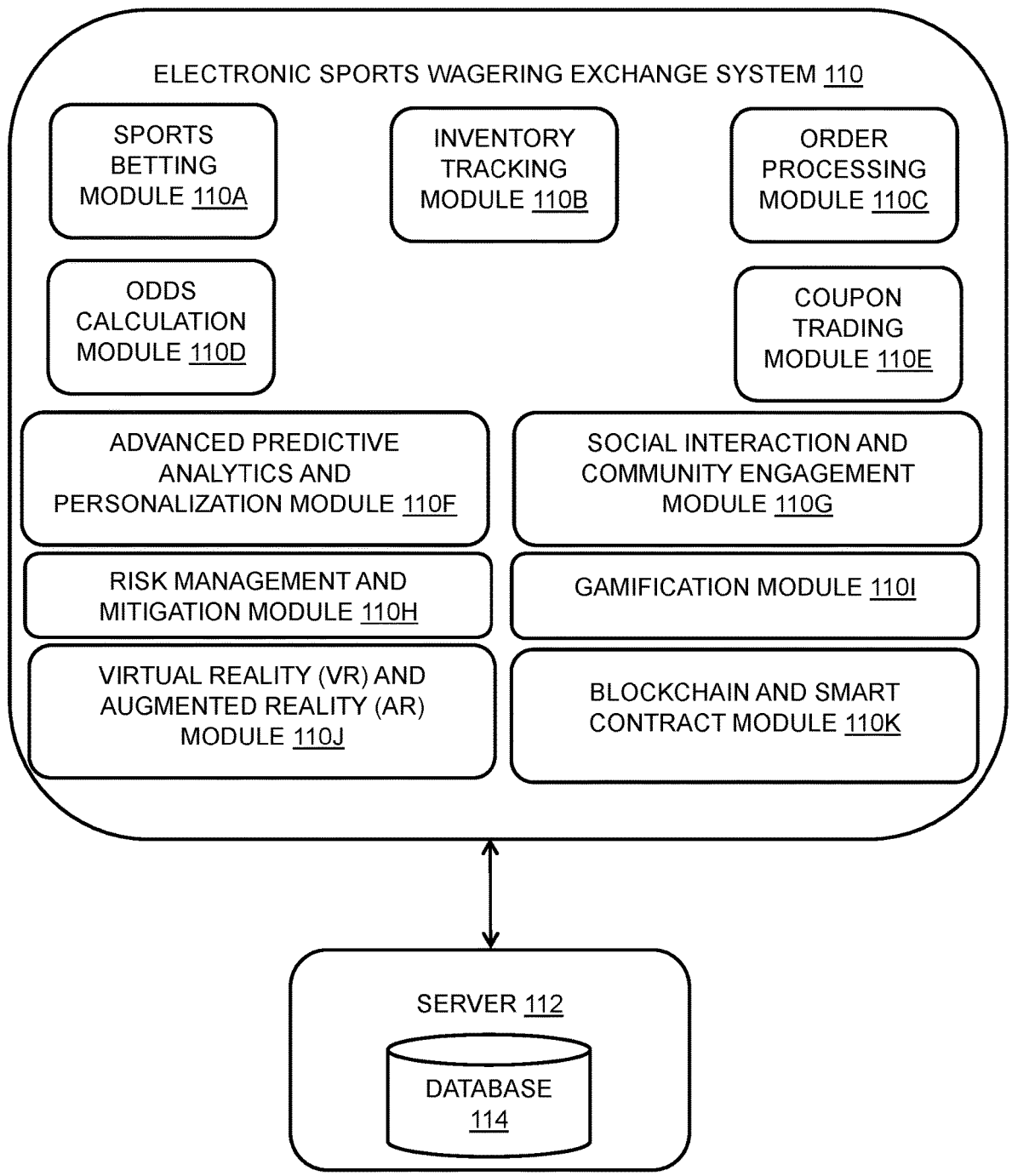

FIGS. 1A & 1B illustrate an electronic sports wagering exchange environment 100 for facilitating a wager-based transaction for a plurality of products or services, in accordance with various embodiments of the present disclosure. The electronic sports wagering exchange environment 100 shows a relationship between various entities involved in facilitating wager-based transactions during a sporting event. In general, a sporting event is a competition involving physical exertion and skill, often played in front of spectators, and can be broadcasted live or recorded for later viewing.

In addition, a sporting event can be organized by an individual, a group, or a company, and can include games like football, basketball, cricket, and the like. Further, sporting events are created for purposes such as entertainment, competition, and the like. Furthermore, sporting events are prepared for viewing and wagering purposes for users. Moreover, sporting events are often organized in a series or tournaments, with each individual game or match serving as an episode in the series.

The electronic sports wagering exchange environment 100 includes a user 102, a computing device 104, a communication network 106, a merchant 108, an electronic sports wagering exchange system 110, a server 112, and a database 114. The electronic sports wagering exchange system 110 includes a sports betting module 110a, an inventory tracking module 110b, an order processing module 110c, and an odds calculation module 110d. These components work together to facilitate the wager-based transactions for the plurality of products or services.

The electronic sports wagering exchange environment 100 includes the user 102. The user 102 is any person present at any location and wants to place the wager or make a purchase order. The user 102 is any legal person or natural person who accesses the electronic sports wagering exchange system 110. The system includes but may not be limited to sports betting, inventory tracking, order processing, and odds calculation modules.

In an embodiment of the present disclosure, the user 102 is an individual or person who wants to buy a new car that costs $100,000.00. Instead of purchasing the new car and paying $100 k, the user 102 can use the electronic sports wagering exchange system 110 to place a $15,000 wager on a football game, with one or multiple parlays. If the user 102 wins, the user 102 gets an $85,000 coupon from the electronic sports wagering exchange system 110 to be applied to the car. If the user 102 loses, the dealer will give them 15% off the price of the car. In a similar example, through the use of a parlay or the use of multiple contingent bets, the purchaser may receive a substantial $45,000 discount on a $100,000 car for a $1,000 wager placed, with the wager being placed for the purchasers benefit with or without the purchasers knowledge, with a smaller discount or coupon provided in the event of a wager loss.

The electronic sports wagering exchange system 110 can also facilitate wager-based transactions for a variety of goods. For instance, the user 102 could place a $15 wager for an Amazon gift card that could be applied to all or some of the goods offered on Amazon. The system also provides the flexibility for the coupons to be tradeable. As such, the user 102 could potentially sell their $85 k coupon for someone else to use. The system's applicability extends to financial markets as well. For example, if the S&P 500 is greater than 15% of what it is today, the user 102 is eligible to receive a coupon. The value of the coupon can be dynamic, allowing the user 102 to place a $15 coupon trade to get a 15% coupon. This dynamic pricing feature enhances the user's flexibility in managing their wagers and potential rewards. In all these scenarios, the electronic sports wagering exchange system 110 ensures a seamless and efficient wagering experience for the user 102, thereby revolutionizing the way wager-based transactions are conducted.

The user 102 is a person placing the wager or making the purchase order on the computing device 104. In an embodiment of the present disclosure, the user 102 is moving from one location to another while interacting with the electronic sports wagering exchange system 110. In another embodiment of the present disclosure, the user 102 is driving while interacting with the electronic sports wagering exchange system 110. In all cases, the user 102 would receive some coupon from the merchant 108, or manufacturer if they lose the wager.

The electronic sports wagering exchange environment 100 includes the computing device 104. The computing device 104 is associated with the user 102. The computing device 104 includes at least one of a portable computing device or a fixed computing device. The portable computing device includes but may not be limited to a smartphone, a laptop, a tablet, wearable watch, an iPhone, iPad, iPod, and a personal digital assistant. In addition, the fixed computing device includes a wager station, a wager terminal, a smart television, a workstation, a desktop computer, and the like. The user 102 accesses the computing device 104 in real-time. In an embodiment of the present disclosure, the computing device 104 is any type of device having an active internet connection. The computing device 104 is an internet-enabled device to allow the user 102 to access the electronic sports wagering exchange system 110. In an embodiment of the present disclosure, the user 102 is an owner of the computing device 104. In another embodiment of the present disclosure, the user 102 is not the owner of the computing device 104. In addition, the computing device 104 is used to interact with the electronic sports wagering exchange system 110.

The user 102 interacts with the electronic sports wagering exchange system 110 through the computing device 104. The computing device 104 is used to run the electronic sports wagering exchange system 110. The electronic sports wagering exchange system 110 is broadcasted to the computing device 104 of the user 102. The computing device 104 is a device used to interact with the electronic sports wagering exchange system 110. In an embodiment of the present disclosure, the computing device 104 is used to store the data of the electronic sports wagering exchange system 110. In an embodiment of the present disclosure, the computing device 104 is moving from one location to another. In an example, location includes park, hotel, home, restaurant, any facility, college, university, office, stores like Walmart, Target, or near any sports stadium, and the like. The computing device 104 can be placed in these locations to facilitate the user's interaction with the electronic sports wagering exchange system 110.

The electronic sports wagering exchange environment 100 includes the communication network 106. The computing device 104 is connected to the communication network 106. The communication network 106 provides a medium for the user 102 accessing the electronic sports wagering exchange system 110 to connect with the server 112. In an embodiment of the present disclosure, the communication network 106 is an internet connection. In another embodiment of the present disclosure, the communication network 106 is a wireless mobile network. In yet another embodiment of the present disclosure, the communication network 106 is a wired network with a finite bandwidth. In yet another embodiment of the present disclosure, the communication network 106 is a combination of the wireless and the wired network for the optimum throughput of data transmission. In yet another embodiment of the present disclosure, the communication network 106 is an optical fiber high bandwidth network that enables a high data rate with negligible connection drops. The communication network 106 includes a set of channels. Each channel of the set of channels supports a finite bandwidth. Moreover, the finite bandwidth of each channel of the set of channels is based on capacity of the communication network 106. The communication network 106 connects the computing device 104 to the server 112 using a plurality of methods. The plurality of methods used to provide network connectivity to the computing device 104 includes 2G, 3G, 4G, 5G, Wifi and the like.

The merchant 108 in the electronic sports wagering exchange environment 100 is a critical component that offers a wide array of products or services. These offerings are the basis for the wager-based transactions facilitated by the electronic sports wagering exchange system 110. The merchant 108 could be any entity that provides goods or services, and their scope is not limited to any specific sector or industry. This broad definition allows for a diverse range of merchants to participate in this unique system, thereby enhancing the variety and appeal of the products or services available for wager-based transactions.

In an example, the merchant 108 could be a car dealership offering a range of vehicles from economy to luxury models. The dealership could list these vehicles on the electronic sports wagering exchange system 110, allowing the user 102 to place wagers and potentially receive significant discounts on their purchases. Alternatively, the merchant 108 could be a retail store, such as a clothing boutique, an electronics store, or a home goods store. These merchants could offer their entire inventory or select items for wager-based transactions, providing the user 102 with a wide array of products to choose from. In the realm of online marketplaces, the merchant 108 could be a platform like Amazon or eBay. These platforms host a multitude of individual sellers and businesses offering a vast variety of products, from books and electronics to furniture and clothing. The user 102 could place wagers on these products, adding an element of excitement to their online shopping experience. Financial institutions could also serve as the merchant 108, offering financial products or services such as stocks, bonds, or investment portfolios. The user 102 could place wagers on the performance of these financial products, potentially earning discounts or bonuses based on the outcome of their wagers.

In an example, a travel agency (the merchant 108) offers a luxury vacation package worth $10,000. The user 102 could place a $1,000 wager on a basketball game through the electronic sports wagering exchange system 110. If the user 102 wins the wager, they receive an $8,000 coupon to apply to the vacation package. Which may be a 'luxury' package, if they lose it may be for a more significant discount or rebate on a 'standard' package or the reverse. If they lose, the travel agency offers a 10% discount on the vacation package. In another example, a ticket vendor (the merchant 108) sells tickets to a popular concert. The user 102 could place a $50 wager on the outcome of a tennis match. If they win, they receive a coupon that covers 90% of the ticket price. If they lose, the vendor offers a 10% discount on the ticket price. In yet another example, an online education platform (the merchant 108) offers a variety of courses. The user 102 could place a $200 wager on a soccer match to enroll in a course worth $2,000. If they win, they receive a $1,800 coupon to apply to the course enrollment. If they lose, the platform offers a 10% discount on the course fee. In yet another example, a restaurant (the merchant 108) offers a lavish dining experience worth $500. The user 102 could place a $50 wager on a boxing match. If they win, they receive a $400 coupon to apply to their dining bill. If they lose, the restaurant offers a 10% discount on the bill.

The inventory tracking module 110b within the electronic sports wagering exchange system 110 plays a crucial role in maintaining up-to-date information about the products or services offered by the merchant 108. The inventory tracking module 110b keeps track of two key pieces of data: a pricing data and an availability data. The pricing data refers to the current prices of the products or services offered by the merchant 108. The prices could be static or dynamic, depending on the nature of the product or service. For instance, the price of a car offered by a car dealership might be static, while the price of a stock offered by a financial institution could be dynamic, changing in real-time based on market conditions. The inventory tracking module 110b continuously updates the pricing data to ensure that the user 102 always has access to the most accurate and current prices when placing wagers or making purchase orders. The availability data refers to the current availability or stock levels of the products or services offered by the merchant 108. For instance, a retail store might have a limited number of a particular clothing item in stock, while an online education platform might have unlimited availability for a particular online course. The inventory tracking module 110b updates the availability data in real-time, ensuring that the user 102 is aware of which products or services are currently available for wager-based transactions.

In an example, if the merchant 108 is a car dealership, the inventory tracking module 110b would maintain data on the current prices of the cars in the dealership's inventory, as well as their availability. If a car is sold, the module would update the availability data accordingly. If the dealership decides to change the price of a car, the module would update the pricing data. In another example, if the merchant 108 is an online marketplace like amazon, the inventory tracking module 110b would maintain data on the prices and availability of millions of products. This data would be continuously updated as sellers on the marketplace change their prices or stock levels. In yet another example, if the merchant 108 is a financial institution offering stocks, the inventory tracking module 110b would maintain data on the current prices of the stocks. This data would be updated in real-time as stock prices fluctuate throughout the trading day.

In an example, if the merchant 108 is a cruise line, the inventory tracking module 110b would maintain data on the current prices of the 'luxury packages' in the cruise lines inventory, as well as their availability, if the 'luxury package', is sold, the module would update the availability data accordingly.

The electronic sports wagering exchange environment 100 includes the electronic sports wagering exchange system 110. The electronic sports wagering exchange system 110 includes the sports betting module 110a, the inventory tracking module 110b, the order processing module 110c, and the odds calculation module 110d. The electronic sports wagering exchange system 110 within the electronic sports wagering exchange environment 100 is a comprehensive system that facilitates wager-based transactions for a variety of products or services. This system comprises several key modules, each with its own unique functionalities.

The sports betting module 110a is responsible for receiving a wager from the user 102 for a predetermined event. The predetermined event could be a gaming activity, a gambling activity, a sporting event, a financial market condition, or any other measurable events. The sports betting module 110a is configured to structure the wager as a parlay comprising a plurality of betting conditions. The sports betting module 110a also enables the user 102 to search and view available bets on the predetermined event in the database 114, and allows the user 102 to place, accept, change, and settle bets in the database 114. The sports betting module 110a facilitates bet placement, acceptance, changing, and settlement functions between two or more users according to bet conditions established in the database 114.

The inventory tracking module 110b maintains the pricing data and the availability data for each of the products or services offered by a plurality of merchants. The inventory tracking module 110b module ensures that the user 102 has access to the most accurate and current information when placing wagers or making purchase orders.

The order processing module 110c receives the purchase order for one or more products or services from the plurality of products or services. The purchase order is linked to the wager placed by the user 102. The order processing module 110c adjusts the purchase price for the purchase order based on the outcome of the wager by converting a potential payout of the wager into a discount or coupon applicable to the purchase order if the outcome of the wager is a winning bet, and applying the discount or coupon to the purchase order to reduce the purchase price. The order processing module 110c provides a larger discount or coupon value when more betting conditions of the parlay are met. The order processing module 110c also facilitates application of discounts to the purchase order linked to a losing bet based on preferences of the merchant 108. The order processing module 110c allows the user 102 to place the purchase order linked to the wager at different wager points, direct the purchase order linked to the wager to a specific merchant from the plurality of merchants, place the purchase order linked to the wager away from current market conditions, and process various order types linked to different bet types including but not limited to moneyline, spread, prop bet, parlay, and over/under bet types. The order processing module 110c allows the user 102 to search, view, and dynamically link available purchase orders to a plurality of bet types offered by the sports betting module 110a.

The odds calculation module 110d dynamically determines a value of the discount or coupon based on a plurality of evolving betting odds and the potential payout of the wager. The odds calculation module 110d ensures that the value of the discount or coupon accurately reflects the current betting odds and potential payout, providing a fair and transparent wagering experience for the user 102.

The electronic sports wagering exchange system 110 also includes a coupon trading module 110e configured to enable the user 102 to sell or trade the discount or coupon resulting from the winning bet. This feature adds an additional layer of flexibility and utility for the user 102, allowing them to maximize the value of their winnings.

The electronic sports wagering exchange system 110 requires no physical presence, no physical "token", and no receipt. The entire process is facilitated electronically through the electronic sports wagering exchange system 110, making it convenient and accessible for the user 102. The electronic sports wagering exchange system 110 uses national betting markets for odds. The national betting markets ensure that the odds are fair, transparent, and based on a wide range of data. The electronic sports wagering exchange system 110 also allows the user 102 to place wagers of which they would execute a wager, as opposed to only accepting wagers proposed by the merchant 108 of goods or services. The electronic sports wagering exchange system 110 gives the user 102 more control over their wagers and potential rewards.

The electronic sports wagering exchange system 110 may also facilitate transactions where the sports betting company itself purchases goods or services from manufacturers and then offers these goods or services as part of a wager-based transaction. For example, the sports betting company could purchase one or more iPhones from Apple at a discounted price, and then offer the one or more iPhones as part of a wager-based transaction. If the user 102 wins the wager, the user 102 could purchase the iPhone at a significant discount. If the user 102 loses the wager, the user 102 could still receive a coupon or rebate that reduces the purchase price of the iPhone.

The sports betting company is allowed to leverage volume discounts from manufacturers, thereby reducing the cost of the goods or services offered in the wager-based transaction. The sports betting company is given a mechanism to sell all the units the sports betting company has purchased, thereby mitigating the risk associated with purchasing a large volume of goods or services. This enhances the user experience by providing them with the opportunity to purchase goods or services at a discount, regardless of the outcome of the wager.

The electronic sports wagering exchange system 110 may also use social media to facilitate these transactions. For example, the electronic sports wagering exchange system 110 may advertise the wager-based transaction on social media platforms, thereby reaching a larger audience. Furthermore, the electronic sports wagering exchange system 110 may combine the goods or services with the main product (For example, the iPhone), thereby providing additional value to the user 102.

The electronic sports wagering exchange system 110 may include an advanced predictive analytics and personalization module 110f configured to collect and analyze a set of data associated with one or more betting activities and one or more purchase behaviors of the user 102. In addition, the set of data includes one or more types of the wager placed, the outcome of the wager placed, timing and frequency of the wager, one or more categories of each of the plurality of products or services purchased, correlation between one or more wagers and one or more purchases, and one or more responses of the user 102 to one or more previous betting suggestions and one or more previous product recommendations. Further, the advanced predictive analytics and personalization module 110f configured to utilize one or more machine learning algorithms to predict a potential wager of the user 102 and one or more linked purchase orders based on analysis of the set of data. Furthermore, one or more predictions are continuously updated and refined as a new set of data is collected and analyzed.

The advanced predictive analytics and personalization module 110f configured to generate one or more betting suggestions and one or more product or service recommendations for the user 102 based on the one or more predictions. The one or more betting suggestions and the one or more product or service recommendations are tailored to one or more betting and purchasing patterns, one or more preferences, and a risk tolerance of the user, thereby enhancing experience and satisfaction of the user 102. In addition, the advanced predictive analytics and personalization module 110f configured to dynamically adjust the value of the discount or coupon offered to the user 102 based on one or more predicted betting odds, the potential payout of the wager, and a historical acceptance rate of one or more discounts or coupons of the user 102. Further, the adjustment is designed to optimize balance between maximizing an incentive of the user 102 to place the one or more wagers and the one or more purchases, and maintaining profitability of each of the plurality of merchants. Furthermore, the advanced predictive analytics and personalization module 110f configured to provide the user 102 with detailed explanations and visualizations of the one or more predictions, the one or more betting suggestions, the one or more product or service recommendations, and one or more adjusted values of the discount or coupon, thereby increasing transparency and enabling the user 102 to take informed decisions.

Suppose a user, John, is an avid sports fan who frequently places wagers on basketball games and purchases related merchandise using the electronic sports wagering exchange system. The advanced predictive analytics and personalization module collects and analyzes data associated with John's betting activities and purchase behaviors. This data includes the types of wagers John has placed (such as moneyline, spread, or over/under bets), the outcomes of those wagers (whether John won or lost), the timing and frequency of his wagers (such as before the game, during the game, or at specific game events), the categories of products or services he purchased (such as team jerseys, game tickets, or sports equipment), the correlation between his wagers and purchases (such as buying a team jersey after winning a bet on the team), and his responses to previous betting suggestions and product recommendations (such as whether he followed the suggestions or recommendations, and whether he won or lost the bets or was satisfied with the purchases).

The module utilizes machine learning algorithms to predict John's potential wagers and linked purchase orders based on the analyzed data. For example, if the data shows that John often places moneyline bets on his favorite team and buys the team's jersey after winning the bets, the module may predict that John will place a similar wager and make a similar purchase for the team's next game. These predictions are continuously updated and refined as new data about John's betting activities and purchase behaviors is collected and analyzed.

Based on the predictions, the module generates betting suggestions and product or service recommendations for John. For instance, it may suggest John to place a moneyline bet on his favorite team for the next game and recommend him a new jersey of the team. These suggestions and recommendations are tailored to John's betting and purchasing patterns, preferences, and risk tolerance, thereby enhancing his experience and satisfaction with the system.

The module also dynamically adjusts the value of the discount or coupon offered to John based on the predicted betting odds, the potential payout of the wager, and John's historical acceptance rate of discounts or coupons. For example, if the betting odds indicate that John's favorite team is likely to win the next game, the module may offer a larger discount on the team's jersey if John places a wager on the team. The adjustment is designed to optimize the balance between maximizing John's incentive to place wagers and make purchases, and maintaining the profitability of the merchants offering the products or services.

Furthermore, the module provides John with detailed explanations and visualizations of the predictions, betting suggestions, product or service recommendations, and adjusted values of the discount or coupon. For example, it may show John a chart of his favorite team's winning odds, a list of suggested wagers and potential payouts, a catalog of recommended jerseys with discounted prices, and a calculation of the discount value based on the betting odds and potential payout. This increases transparency and enables John to make informed decisions about his wagers and purchases.

The electronic sports wagering exchange system 110 may include a social interaction and community engagement module 110g configured to integrate with one or more social media platforms, allowing the user 102 to share the wager and the purchase order directly from the electronic sports wagering exchange system 110. In addition, a shared content of the wager and the purchase order may be customized with rich media and interactive elements to enhance appeal and engagement. Further, the social interaction and community engagement module 110g is configured to provide a unique referral system, enabling the user 102 to invite one or more friends or one or more other users to place one or more wagers or one or more purchase orders. Furthermore, the social interaction and community engagement module 110g may track one or more referrals and provide real-time updates to the user 102 about one or more activities of the one or more friends or the one or more other users. Moreover, the social interaction and community engagement module 110g is configured to establish a dynamic discussion platform. Also, each of one or more users may create one or more threads, post one or more comments, and exchange one or more ideas about the one or more wagers and the one or more purchase orders. Also, the social interaction and community engagement module 110g may support one or more content formats comprising text, images, videos, and polls, and provide one or more moderation tools to ensure a positive and respectful discussion environment.

The social interaction and community engagement module 110g is configured to implement a sophisticated reward mechanism, which rewards the user 102 with one or more additional discounts or coupons for one or more successful referrals, and recognizes contribution of the user 102 to community. The contribution may include but not limited to creating one or more popular discussion threads, providing one or more helpful comments, or achieving high engagement on the shared content. In addition, one or more rewards may be tiered based on a level of the contribution of the user 102 and may be redeemed in one or more ways within the electronic sports wagering exchange system 110. Further, the social interaction and community engagement module 110g is configured to utilize one or more machine learning algorithms to analyze one or more social interactions and community engagement, and provide one or more personalized suggestions to the user 102 for one or more potential wagers, the one or more purchase orders, one or more discussion topics, or friends to invite. The one or more personalized suggestions may be continuously refined based on feedback and one or more interaction patterns of the user 102.

Suppose a user, Alice, is using the electronic sports wagering exchange system to place a wager on a basketball game and purchase a team jersey. The social interaction and community engagement module integrates with Alice's social media platforms, allowing her to share her wager and the purchase order directly from the system. The shared content could include a picture of the team jersey, the details of the wager, and a link to the system, and could be customized with rich media and interactive elements, such as animations, emojis, or interactive polls, to enhance its appeal and engagement.

The module also provides a unique referral system, enabling Alice to invite her friends or other users to place similar wagers or purchase orders. For instance, Alice could send a referral link to her friend Bob, who is also a fan of the same basketball team. The module tracks the referral and provides real-time updates to Alice about Bob's activities, such as whether Bob has clicked the referral link, placed a wager, or made a purchase.

Furthermore, the module establishes a dynamic discussion platform within the system. Alice, Bob, and other users can create discussion threads, post comments, and exchange ideas about their wagers and purchase orders. For example, they could discuss the upcoming basketball game, share their betting strategies, or recommend team merchandise. The platform supports various content formats, such as text, images, videos, and polls, and provides moderation tools to ensure a positive and respectful discussion environment.

The module also implements a sophisticated reward mechanism, which rewards Alice with additional discounts or coupons for successful referrals, and recognizes her contribution to the community. For instance, if Bob places a wager or makes a purchase through Alice's referral link, Alice could receive a discount on her next purchase order. If Alice creates a popular discussion thread or provides helpful comments, she could receive a badge or additional gamification points. The rewards are tiered based on Alice's level of contribution and can be redeemed in various ways within the system, such as applying to purchase orders, converting to gamification points, or exchanging for special offers.

Finally, the module utilizes machine learning algorithms to analyze the social interactions and community engagement, and provide personalized suggestions to Alice for potential wagers, purchase orders, discussion topics, or friends to invite. For example, if the analysis shows that Alice often discusses basketball games with Bob, the module may suggest Alice to place a wager on the next game Bob mentions, or invite Bob to a new discussion thread about basketball betting strategies. The suggestions are continuously refined based on Alice's feedback and interaction patterns, thereby enhancing her experience and satisfaction with the system.

The electronic sports wagering exchange system 110 may include a risk management and mitigation module 110*h* configured to fetch and analyze a comprehensive set of data associated with one or more wagering activities of the user 102. In addition, the comprehensive set of data includes but not limited to one or more types of the wager placed, the outcome of the wager placed, timing and frequency of the wager, correlation between one or more wagers and one or more purchases, and one or more responses of the user 102 to one or more previous risk assessment reports. Further, the risk management and mitigation module 110*h* is configured to utilize one or more machine learning algorithms to assess a risk level of the wager placed by the user 102 based on the analysis of the comprehensive set of data, one or more current market conditions, and one or more real-time updates from one or more predetermined events. Furthermore, the risk level is continuously updated and refined as a new set of data is collected and analyzed. Moreover, the risk management and mitigation module 110*h* is configured to generate one or more real-time risk assessment reports for the user 102. Also, the one or more real-time risk assessment reports includes but not limited to one or more detailed explanations and visualizations of the risk level, one or more potential consequences of the wager, and one or more alternative wagers or purchase orders that may mitigate potential losses. Also, the one or more real-time risk assessment reports are tailored to one or more betting and purchasing patterns, one or more preferences, and a risk tolerance of the user 102, thereby enhancing experience and satisfaction of the user.

The risk management and mitigation module 110*h* is configured to dynamically adjust the value of the discount or coupon offered to the user 102 based on the risk level, one or more specifics of the wager, and a historical acceptance rate of one or more discounts or coupons of the user 102. In addition, the dynamic adjustment is designed to provide an appropriate incentive for the user 102 to take calculated risks and to maintain profitability. Further, the risk management and mitigation module 110*h* is configured to provide the user 102 with one or more tools and resources to learn about risk management in wagering and purchasing, such as educational content, interactive simulations, and personalized advice, thereby enhancing skill and confidence of the user 102 in managing risks.

Suppose a user, Sarah, is using the electronic sports wagering exchange system to place a wager on a tennis match and purchase a tennis racket. The risk management and mitigation module fetches and analyzes a comprehensive set of data associated with Sarah's wagering activities. This data includes the types of wagers Sarah has placed (such as moneyline or over/under bets), the outcomes of those wagers (whether Sarah won or lost), the timing and frequency of her wagers (such as before the match or during the match), the correlation between her wagers and purchases (such as buying a tennis racket after winning a bet on a tennis match), and her responses to previous risk assessment reports (such as whether she adjusted her bets based on the reports).

The module utilizes machine learning algorithms to assess the risk level of Sarah's wager based on the analyzed data, current market conditions, and real-time updates from the tennis match. For example, if the data shows that Sarah often places over/under bets on tennis matches and the current market conditions indicate a high-scoring match, the module may assess a high risk level for Sarah's wager. The risk level is continuously updated and refined as new data about Sarah's wagering activities and the tennis match is collected and analyzed.

Based on the assessed risk level, the module generates a real-time risk assessment report for Sarah. The report includes a detailed explanation and visualization of the risk level, the potential consequences of her wager (such as the potential loss if the wager is unsuccessful), and alternative wagers or purchase orders that could mitigate potential losses (such as placing a moneyline bet instead of an over/under bet, or purchasing a tennis ball set instead of a tennis racket). The report is tailored to Sarah's betting and purchasing patterns, preferences, and risk tolerance, thereby enhancing her experience and satisfaction with the system.

Furthermore, the module dynamically adjusts the value of the discount or coupon offered to Sarah based on the assessed risk level, the specifics of her wager, and her historical acceptance rate of discounts or coupons. For example, if the risk level is high and Sarah has a history of accepting discounts, the module may offer a larger discount on the tennis racket if Sarah places a safer wager. The adjustment is designed to provide an appropriate incentive for Sarah to take calculated risks and to maintain the profitability of the merchants offering the products or services.

Finally, the module provides Sarah with tools and resources to learn about risk management in wagering and purchasing. These could include educational content about different types of wagers and their associated risks, interactive simulations that allow Sarah to experiment with different wagering strategies and see their potential outcomes, and personalized advice based on Sarah's betting and purchasing history. These resources enhance Sarah's skills and confidence in managing risks, thereby improving her overall experience with the system.

The electronic sports wagering exchange system 110 may include a gamification module 110i configured to implement a multi-tiered level. Each of the multi-tiered level represents a range of wagering activities and purchase behaviors. In addition, the multi-tiered level is designed to progressively challenge the user 102 and encourage a wide range of wagering and purchasing activities. Further, the gamification module 110i is configured to introduce a plurality of challenges that are dynamically generated based on one or more wagering activities of the user 102, purchase history, and current level. Furthermore, the plurality of challenges may involve one or more types of one or more wagers, one or more purchase orders, one or more social interactions, and one or more learning activities. Moreover, the gamification module 110i is configured to award one or more badges, one or more additional discounts, or one or more special offers to the user 102 upon completion of one or more challenges from the plurality of challenges or reaching a specific level from any of the multi-tiered level. Also, the one or more badges, the one or more additional discounts, or the one or more special offers are personalized based on one or more preferences of the user 102 and designed to provide a sense of achievement and motivation to the user 102.

The gamification module 110i is configured to create one or more leaderboards to rank a plurality of users based on one or more metrics. In addition, the one or more metrics includes but not limited to a wagering success, a purchase activity, a challenge completion, a level progression, and one or more gamification points. Further, the one or more leaderboards may be filtered by one or more time periods, one or more geographical locations, or one or more user groups, providing a competitive and social element to the electronic sports wagering exchange system 110. Furthermore, the gamification module 110i is configured to enable one or more users from the plurality of users to exchange the one or more gamification points for the one or more additional discounts, the one or more special offers, exclusive content, or other benefits within the electronic sports wagering exchange system 110. Moreover, the exchange rates and available options may be dynamically adjusted based on one or more objectives of the electronic sports wagering exchange system 110 and an engagement level of the user 102. Also, the gamification module 110i is configured to utilize one or more machine learning algorithms to analyze a participation of the user 102 with the gamification module, and continuously optimize the multi-tiered level, the plurality of challenges, the one or more badges, the one or more additional discounts, the one or more special offers, one or more leaderboards, and one or more exchange options to maximize user satisfaction, retention, and profitability.

Suppose a user, David, is using the electronic sports wagering exchange system to place a wager on a soccer match and purchase a team scarf. The gamification module implements a multi-tiered level system, where each level represents a range of David's wagering activities and purchase behaviors. For example, Level 1 could represent placing a single wager and making a single purchase, while Level 2 could represent placing multiple wagers and making multiple purchases.

The multi-tiered level system is designed to progressively challenge David and encourage a wide range of wagering and purchasing activities. For instance, to progress from Level 1 to Level 2, David might need to place a wager on a different type of soccer bet (such as an over/under bet instead of a moneyline bet) or purchase a different type of product (such as a team jersey instead of a team scarf).

The gamification module introduces a variety of challenges that are dynamically generated based on David's wagering activities, purchase history, and current level. For example, a challenge at Level 2 could involve placing an over/under bet on a soccer match and purchasing a team jersey. The challenges could also involve social interactions, such as sharing his wager or purchase on social media, and learning activities, such as reading an article about soccer betting strategies.

Upon completion of the challenges or reaching a specific level, the gamification module awards David with badges, additional discounts, or special offers. For instance, David could receive a "Soccer Expert" badge for completing the Level 2 challenge, a discount on his next purchase for reaching Level 2, or a special offer for a limited-edition team jersey. These rewards are personalized based on David's preferences and designed to provide a sense of achievement and motivation.

The gamification module also creates leaderboards to rank users based on various metrics, such as wagering success, purchase activity, challenge completion, level progression, and gamification points. David could see his ranking among all users, among users in the same geographical location, or among users who placed wagers on the same soccer match. This provides a competitive and social element to the system.

Furthermore, the gamification module enables David to exchange his gamification points for additional discounts, special offers, exclusive content, or other benefits within the system. For example, David could exchange his points for a larger discount on a team jersey, a special offer for a VIP soccer match ticket, or exclusive content about soccer betting strategies. The exchange rates and available options are dynamically adjusted based on the system's objectives and David's engagement level.

Finally, the gamification module utilizes machine learning algorithms to analyze David's participation with the gamification features, and continuously optimize the multi-tiered level system, challenges, rewards, leaderboards, and exchange options to maximize David's satisfaction, retention, and the system's profitability. For example, if the analysis shows that David is highly engaged with the soccer-related challenges and rewards, the module may introduce more soccer-related challenges and rewards at the next level, or offer more favorable exchange rates for soccer-related discounts or special offers.

The electronic sports wagering exchange system 110 may include a Virtual Reality (VR) and Augmented Reality (AR) module 110j configured to provide a VR and AR interface for the user 102 to interact with the electronic sports wagering exchange system 110, place one or more wagers, and make one or more purchase orders. In addition, the VR and AR interface may switch between one or more VR and AR modes based on one or more preference of the user 102 or a context of the interaction. Further, the VR and AR module 110j is configured to simulate the predetermined event in real-time in the VR mode allowing the user 102 to experience the predetermined event virtually. Furthermore, the simulation may include realistic 3D graphics, spatial audio, and haptic feedback to enhance immersion. Moreover, the VR and AR module 110j is configured to overlay real-time information about the wager and the plurality of products or services onto a physical environment of the user 102 in the AR mode. The information may be interactively manipulated and explored by the user 102. Also, the VR and AR module 110j is configured to enable the user 102 to virtually explore the one or more products or services linked to the wager from the plurality of products or services in the VR mode and the AR mode. The exploration may include one or more 3D models of each of the one or more products or virtual demonstrations of the one or more services.

The VR and AR module 110j is configured to provide a virtual marketplace in the VR mode where a plurality of users may interact with each other, discuss the one or more wagers, and share experiences. In addition, the virtual marketplace may replicate social dynamics and spatial navigation of a physical marketplace. Further, the VR and AR module 110j is configured to enable the user 102 to see and interact with the one or more wagers and the one or more purchase orders of one or more other users in the AR mode. Furthermore, the interaction may include liking, commenting, or sharing the one or more wagers and the one or more purchase orders.

Suppose a user, Emma, is using the electronic sports wagering exchange system to place a wager on a Formula 1 race and purchase a team cap. The Virtual Reality (VR) and Augmented Reality (AR) module provides a VR and AR interface for Emma to interact with the system, place her wager, and make her purchase order.

In the VR mode, Emma can experience the Formula 1 race virtually as if she were physically present at the race track. The simulation includes realistic 3D graphics of the race cars and the track, spatial audio of the roaring engines, and haptic feedback of the vibrations, enhancing the immersion of the experience. Emma can also virtually explore the team cap linked to her wager, such as viewing a 3D model of the cap, inspecting its details, or even trying it on a virtual avatar.

In the AR mode, Emma can overlay real-time information about her wager and the team cap onto her physical environment. For example, she could see the current odds of her wager and the discounted price of the cap overlaid onto her living room. She can interactively manipulate and explore this information, such as updating the odds based on the race progress or viewing the cap from different angles.

The VR and AR module also provides a virtual marketplace in the VR mode where Emma and other users can interact with each other, discuss their wagers, and share experiences. The virtual marketplace replicates the social dynamics and spatial navigation of a physical marketplace, such as a betting shop or a sports store. Emma can see and interact with the wagers and purchase orders of other users, such as liking, commenting, or sharing the wagers and orders. For instance, she could like a wager placed by another user on the same race, comment on a purchase order for a different team cap, or share her own wager and order with her friends.

The VR and AR interface can switch between the VR and AR modes based on Emma's preference or the context of the interaction. For example, Emma might prefer the VR mode when she is at home and has time to immerse herself in the virtual experience, and switch to the AR mode when she is on the go and needs quick updates overlaid onto her real-world view. This seamless integration of VR and AR enhances Emma's experience and satisfaction with the system.

The electronic sports wagering exchange system 110 may include a blockchain and smart contract module 110k configured to record each of one or more wagers, each of one or more purchase orders, and one or more wager-based transactions on a decentralized blockchain ledger. In addition, the decentralized blockchain ledger is maintained by one or more nodes in a peer-to-peer network, ensuring redundancy and resilience. Further, the blockchain and smart contract module 110k is configured to utilize one or more cryptographic hash functions and one or more digital signatures to ensure transparency, immutability, and security of wagering and purchasing process. Each of the one or more wager-based transactions is timestamped. Furthermore, the blockchain and smart contract module 110k is configured to implement one or more smart contracts that automatically execute the outcome of the wager placed and apply the discount or coupon based on one or more predefined rules and real-time data from the predetermined event. Moreover, the one or more smart contracts are transparent, deterministic, and self-executing, ensuring fairness and efficiency of the wagering and purchasing process.

The blockchain and smart contract module 110k is configured to enable the user 102 to verify the fairness of the outcome of the wager, an accuracy of the discount or coupon applied, and an integrity of entire process by inspecting the decentralized blockchain ledger and the one or more smart contracts. In addition, the verification may be done using one or more blockchain explorers and one or more smart contract analysis tools. Further, the blockchain and smart contract module 110k is configured to provide a secure and trustless platform for the user 102 to trade or sell the discount or coupon to one or more other users. Furthermore, the trade or sale of the discount or coupon is facilitated by the one or more smart contracts and recorded on the decentralized blockchain ledger, ensuring the security, transparency, and traceability of the one or more wager-based transactions. Moreover, the blockchain and smart contract module 110k is configured to utilize one or more machine learning algorithms to analyze a blockchain data, detect one or more fraudulent activities or market manipulations, and continuously optimize the one or more smart contracts and trading platform to maximize user satisfaction, integrity, and operational efficiency.

Suppose a user, Mike, is using the electronic sports wagering exchange system to place a wager on a hockey game and purchase a team hat. The blockchain and smart contract module records Mike's wager, his purchase order for the team hat, and all associated transactions (such as the payment for the wager and the application of any discount or coupon) on a decentralized blockchain ledger. This ledger is maintained by multiple nodes in a peer-to-peer network, ensuring the redundancy and resilience of the data.

The module utilizes cryptographic hash functions and digital signatures to ensure the transparency, immutability, and security of the wagering and purchasing process. Each transaction is timestamped and linked to the previous transaction, forming a tamper-evident chain of records.

The module also implements smart contracts that automatically execute the outcome of Mike's wager and apply the discount or coupon based on predefined rules and real-time data from the hockey game. For example, if Mike placed a wager on a specific team to win and that team indeed wins, the smart contract would automatically execute the outcome of the wager, calculate the potential payout, and convert it into a discount or coupon for Mike's purchase order. These smart contracts are transparent, deterministic, and self-executing, ensuring the fairness and efficiency of the wagering and purchasing process.

Furthermore, the module enables Mike to verify the fairness of the outcome of his wager, the accuracy of the discount or coupon applied, and the integrity of the entire process by inspecting the blockchain ledger and the smart contracts. Mike could use blockchain explorers and smart contract analysis tools to inspect the ledger and the contracts, check the timestamps and the links between transactions, and verify the execution of the smart contracts.

The module also provides a secure and trustless platform for Mike to trade or sell his discount or coupon to other users. For instance, if Mike wins a large discount on a team hat but he already has one, he could sell or trade the discount to another user who wants to buy the hat. The trade or sale is facilitated by smart contracts and recorded on the blockchain ledger, ensuring the security, transparency, and traceability of the transactions.

Finally, the module utilizes machine learning algorithms to analyze the blockchain data, detect fraudulent activities or market manipulations, and continuously optimize the smart contracts and the trading platform. For example, if the analysis detects a suspicious pattern of transactions, the module could alert Mike and the system administrators, and adjust the smart contracts to prevent potential fraud. The module could also optimize the trading platform based on Mike's trading activities and preferences, such as recommending potential trades or adjusting the trading interface, to maximize Mike's satisfaction, the system's integrity, and the operational efficiency.

The electronic sports wagering exchange environment 100 includes the server 112 and the database 114. The electronic sports wagering exchange system 110 is associated with the server 112. In general, server is a computer program or device that provides functionality for other programs or devices. The server 112 provides various functionalities, such as sharing data or resources among multiple merchants & users, or performing computation for the merchant 108 and the user 102. However, those skilled in the art would appreciate that the electronic sports wagering exchange system 110 is connected to more number of servers. Furthermore, it may be noted that the server 112 includes the database 114. However, those skilled in the art would appreciate that more number of the servers include more numbers of database.

In an embodiment of the present disclosure, the electronic sports wagering exchange system 110 is located in the server 112. In another embodiment of the present disclosure, the electronic sports wagering exchange system 110 is connected with the server 112. In yet another embodiment of the present disclosure, the electronic sports wagering exchange system 110 is a part of the server 112. The server 112 handles each operation and task performed by the electronic sports wagering exchange system 110. The server 112 stores one or more instructions for performing the various operations of the electronic sports wagering exchange system 110. The server 112 is associated with an administrator. In addition, the administrator manages the different components of the electronic sports wagering exchange system 110. The administrator coordinates the activities of the components involved in the electronic sports wagering exchange system 110. The administrator is any person or individual who monitors the working of the electronic sports wagering exchange system 110 and the server 112 in real-time. The administrator monitors the working of the electronic sports wagering exchange system 110 and the server 112 through a communication device. The communication device includes the laptop, the desktop computer, the tablet, a personal digital assistant and the like.

The database 114 stores different sets of information associated with various components of the electronic sports wagering exchange system 110. In addition, the database 114 is used to hold general information and specialized data, such as the pricing data and the availability data for each of the plurality of products or services offered by the merchant 108, data of the computing device 104, data of the user 102, data of the merchant 108, data of the predetermined event, and the like. The database 114 organizes the data using model such as relational models or hierarchical models. Further, the database 114 stores data provided by the administrator.

Figure 2:
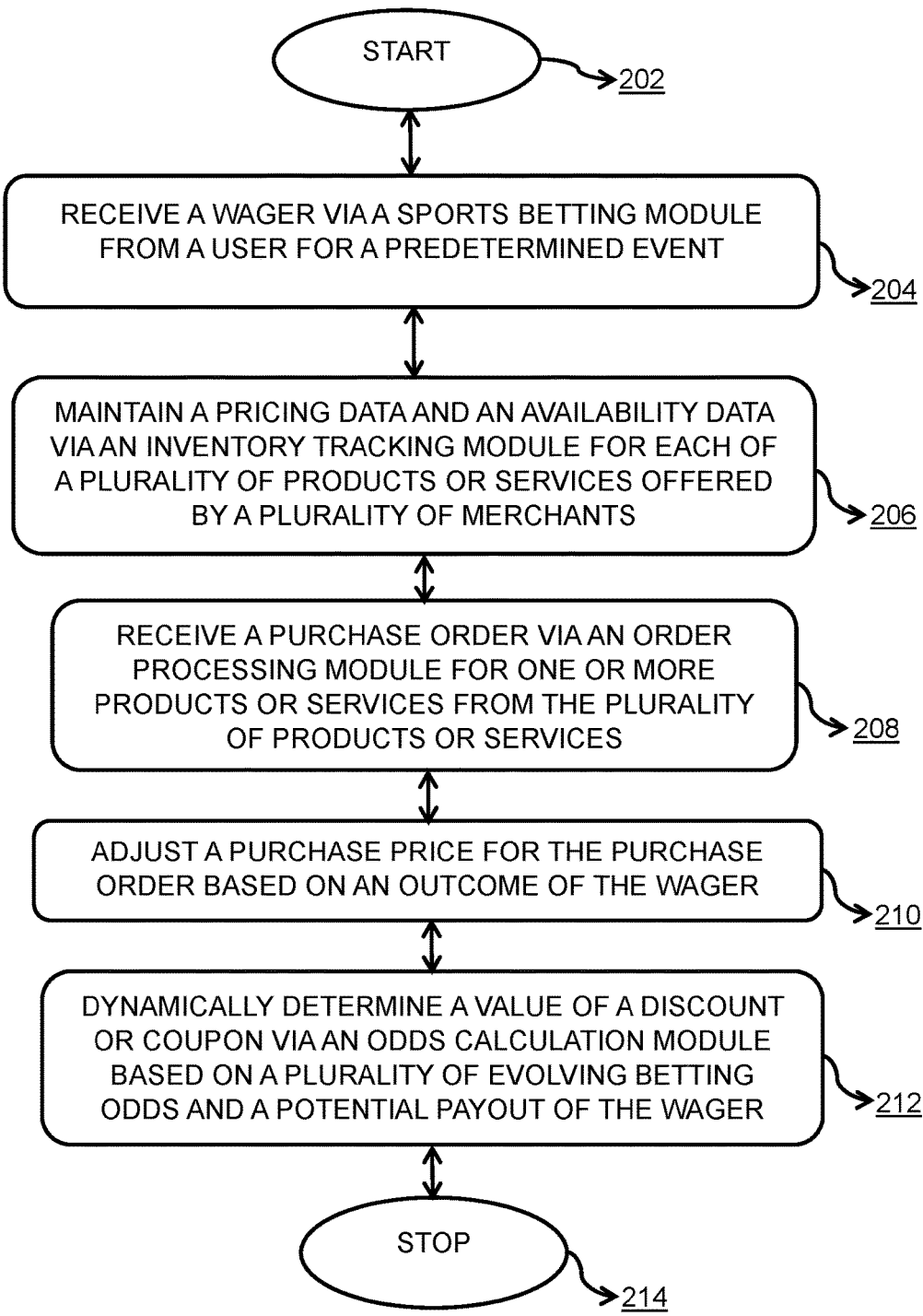
FIG. 2 illustrates a flowchart of a method for facilitating the wager-based transaction for the plurality of products or services, in accordance with various embodiments of the present disclosure.

FIG. 2 illustrates a flowchart 200 of a method for facilitating the wager-based transaction for the plurality of products or services, in accordance with various embodiments of the present disclosure. It may be noted that in order to explain the method steps of the flowchart 200, references will be made to the elements explained in FIGS. 1A and 1B. The flow chart 200 starts at step 202. At step 204, the sports betting module 110a of the electronic sports wagering exchange system 110 receives the wager from the user 102 for the predetermined event. At step 206, the inventory tracking module 110b of the electronic sports wagering exchange system 110 maintains the pricing data and the availability data for each of the plurality of products or services offered by the plurality of merchants. At step 208, the order processing module 110c of the electronic sports wagering exchange system 110 receives the purchase order for the one or more products or services from the plurality of products or services. At step 210, the order processing module 110c of the electronic sports wagering exchange system 110 adjusts the purchase price for the purchase order based on the outcome of the wager by converting the potential payout of the wager into the discount or coupon applicable to the purchase order if the wager is the winning bet, and applying the discount or coupon to the purchase order to reduce the purchase price. At step 212, the odds calculation module 110d of the electronic sports wagering exchange system 110 dynamically determines the value of the discount or coupon based on the plurality of evolving betting odds and the potential payout of the wager. The flow chart 200 terminates at step 214. It may be noted that the flowchart 200 is explained to have above stated process steps; however, those skilled in the art would appreciate that the flowchart 200 may have more/less number of process steps which may enable all the above stated embodiments of the present disclosure.

FIG. 3 illustrates an exemplary electronic sports wagering exchange 300 of the purchase order, in accordance with various embodiments of the present disclosure. In the exemplary electronic sports wagering exchange 300, the user 102 is interested in purchasing a Samsung smartphone worth $1,000 from the merchant 108. The user 102 places the wager on the predetermined event, such as a football game between the Packers and the Bears on Oct. 1, 2023. The user 102 wagers $150 with a 15% probability of winning, taking −1.0 points.

If the user 102 wins the wager, the order processing module 110C converts the potential payout of the wager into an $850 coupon. This coupon can be applied to the purchase of the smartphone, significantly reducing the purchase price. If the user 102 loses the wager, Amazon, acting as a third party, gives them a coupon for a discount on the smartphone. In this case, the discount is 20% of the smartphone's price, which equals to the amount of the wager ($150). An additional 5% discount is offered to the user 102 for placing the wager, making the total discount offered by Amazon 25%.

The user 102 can also place a wager on a different event, such as a football game between the Packers and the Lions on Oct. 8, 2023. In this case, the user 102 wagers $500 with a 50% probability of winning, taking 2.0 points. If the user 102 wins the wager, the potential payout of the wager is converted into a $500 coupon. If the user 102 loses the wager, Samsung, acting as a third party, gives them a coupon for a 15% discount on the smartphone, which equals to the amount of the wager ($150). An additional 5% discount is offered to the user 102 for placing the wager, making the total discount offered by Samsung 20%.

Figure 4:
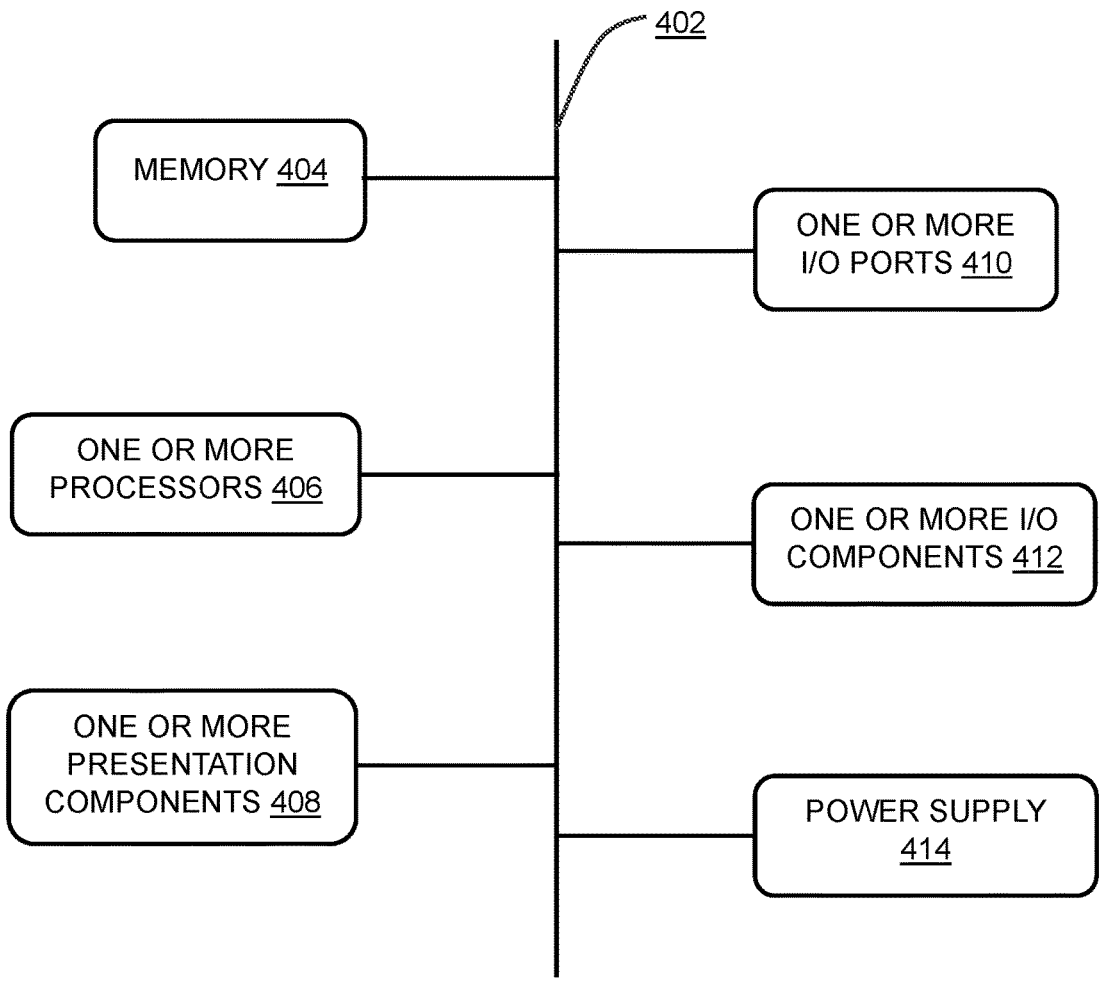
FIG. 4 illustrates a block diagram of a computing device, in accordance with various embodiments of the present disclosure.

FIG. 4 illustrates a block diagram of a computing device 400, in accordance with various embodiments of the present disclosure. The computing device 400 includes a bus 402 that directly or indirectly couples the following devices: a memory 404, one or more processors 406, one or more presentation components 408, one or more input/output (I/O) ports 410, one or more input/output components 412, and an illustrative power supply 414. The bus 402 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device 400 that can be used in connection with one or more embodiments of the present invention. Distinction is not made between such categories as "workstation," "server," "laptop," "hand-held device," etc., as all are contemplated within the scope of FIG. 4 and reference to "computing device."

The computing device 400 typically includes a variety of computer-readable media. The computer-readable media can be any available media that can be accessed by the computing device 400 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data.

The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. The memory 404 may be removable, non-removable, or a combination thereof. Exemplary hardware devices include solid-state memory, hard drives, optical-disc drives, etc. The computing device 400 includes one or more processors that read data from various entities such as memory 404 or I/O components 412. The one or more presentation components 408 present data indications to a user or other device. Exemplary presentation components include a display device, speaker, printing component, vibrating component, etc. The one or more I/O ports 410 allow the computing device 400 to be logically coupled to other devices including the one or more I/O components 412, some of which may be built in. Illustrative components include a microphone, joystick, game pad, satellite dish, scanner, printer, wireless device, etc.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An electronic sports wagering exchange system for facilitating a wager-based transaction for a plurality of products or services comprising:
   a processor; and
   a memory coupled to the processor, with instructions stored thereon that, when executed by the processor, cause the processor to perform operations comprising:
     receiving a wager from a user for a predetermined event, wherein the predetermined event comprising a gaming activity, a gambling activity, a sporting event, or a financial market condition;
     the electronic wagering exchange system further maintaining inventory tracking, comprising pricing data and an availability data for each of the plurality of products or services offered by a plurality of merchants;
     receiving a purchase order for one or more products or services from the plurality of products or services, wherein the purchase order is linked to the wager placed by the user or on behalf of the user;
     adjusting a purchase price for the purchase order based on an outcome of the wager by:
       converting a potential payout of the wager into a discount or coupon applicable to the purchase order if the outcome of the wager is a winning bet; and
       applying the discount or coupon to the purchase order to reduce the purchase price; and
     dynamically determining a value of the discount or coupon based on a plurality of evolving betting odds and the potential payout of the wager; and the electronic wagering exchange system, further comprising risk management and mitigation, that is configured to:
fetch and analyze a comprehensive set of data associated with one or more wagering activities of the user, wherein the comprehensive set of data comprising but not limited to one or more types of the wager placed, the outcome of the wager placed, timing and frequency of the wager, correlation between one or more wagers and one or more purchases, and one or more responses of the user to one or more previous risk assessment reports:
utilize one or more machine learning algorithms to assess a risk level of the wager placed by the user based on the analysis of the comprehensive set of data, one or more current market conditions, and one or more real-time updates from one or more predetermined events, the risk level is continuously updated and refined as a new set of data is collected and analyzed;
generate one or more real-time risk assessment reports for the user, wherein the one or more real-time risk assessment reports comprising one or more detailed explanations and visualizations of the risk level, and one or more potential consequences of the wager, wherein the one or more real-time risk assessment reports are tailored to one or more betting and purchasing patterns, one or more preferences, and a risk tolerance of the user;
dynamically adjust the value of the discount or coupon offered to the user based on the risk level, one or more specifics of the wager, and a historical acceptance rate of one or more discounts or coupons of the user; and
provide the user with one or more tools and resources to learn about risk management in wagering and purchasing, comprising educational content, interactive simulations, and personalized advice.

2. The electronic sports wagering exchange system of claim 1, further configured to structure the wager as a parlay comprising a plurality of betting conditions, and providing a larger discount or coupon value when more betting conditions of the parlay are met.

3. The electronic sports wagering exchange system of claim 1, further comprising enabling the user to sell or trade the discount or coupon resulting from the winning bet.

4. The electronic sports wagering exchange system of claim 1, further configured to facilitate application of discounts to the purchase order linked to a losing bet based on preferences of the plurality of merchants.

5. The electronic sports wagering exchange system of claim 1, further configured to:
enable the user to search and view available bets on the predetermined event in a database; and
allow the user to place, accept, change, and settle bets in the database.

6. The electronic sports wagering exchange system of claim 1, further configured to:
allow the user to place the purchase order linked to the wager at different wager points;
allow the user to direct the purchase order linked to the wager to a specific merchant from the plurality of merchants;
allow the user to place the purchase order linked to the wager away from current market conditions; and
process various order types linked to different bet types including but not limited to moneyline, spread, prop bet, parlay, and over/under bet types.

7. The electronic sports wagering exchange system of claim 1, further configured to facilitates bet placement, acceptance, changing, and settlement functions between two or more users according to bet conditions established in a database.

8. The electronic sports wagering exchange system of claim 1, further configured to allows the user to search, view, and dynamically link available purchase orders to a plurality of bet types offered.

9. The electronic sports wagering exchange system of claim 1, further configured to:
collect and analyze a set of data associated with one or more betting activities and one or more purchase behaviors of the user, wherein the set of data comprising one or more types of the wager placed, the outcome of the wager placed, timing and frequency of the wager, one or more categories of products or services purchased, correlation between one or more wagers and one or more purchases, and one or more responses of the user to one or more previous betting suggestions and one or more previous product recommendations;
utilize one or more machine learning algorithms to predict a potential wager of the user and one or more linked purchase orders based on analysis of the set of data, one or more predictions are continuously updated and refined as a new set of data is collected and analyzed;
generate one or more betting suggestions and one or more product or service recommendations for the user based on the one or more predictions, the one or more betting suggestions and the one or more product or service recommendations are tailored to one or more betting and purchasing patterns, one or more preferences, and a risk tolerance of the user;
dynamically adjust the value of the discount or coupon offered to the user based on one or more predicted betting odds, the potential payout of the wager, and a historical acceptance rate of one or more discounts or coupons of the user, wherein the adjustment is designed to optimize balance between maximizing an incentive of the user to place the one or more wagers and the one or more purchases, and maintaining profitability of each of the plurality of merchants; and
provide the user with detailed explanations and visualizations of the one or more predictions, the one or more betting suggestions, the one or more product or service recommendations, and one or more adjusted values of the discount or coupon, thereby increasing transparency.

10. The electronic sports wagering exchange system of claim 1, further comprising:
integration with one or more social media platforms, allowing the user to share the wager and the purchase order directly from the electronic sports wagering exchange system, wherein a shared content of the wager and the purchase order may be customized with rich media and interactive elements;
provide a referral system, enabling the user to invite one or more friends or one or more other users to place one or more wagers on one or more purchase orders, tracking one or more referrals and provide real-time updates to the user about one or more activities of the one or more friends or the one or more other users;
establish a dynamic discussion platform, wherein each of one or more users may create one or more threads, post one or more comments, and exchange one or more ideas about the one or more wagers and the one or more purchase orders, supporting one or more content formats comprising text, images, videos, and polls, and provide one or more moderation tools;

implement a reward mechanism, which rewards the user with one or more additional discounts or coupons for one or more successful referrals, and recognizes contribution of the user to community, wherein the contribution comprising creating one or more popular discussion threads, providing one or more helpful comments, or achieving high engagement on the shared content, wherein one or more rewards may be tiered based on a level of the contribution of the user and may be redeemed in one or more ways within the electronic sports wagering exchange system; and utilize machine learning algorithms to analyze one or more social interactions and community engagement, and provide one or more personalized suggestions to the user for one or more potential wagers, the one or more purchase orders, one or more discussion topics, or friends to invite, wherein the one or more personalized suggestions may be continuously refined based on feedback and one or more interaction patterns of the user.

11. The electronic sports wagering exchange system of claim 1, further comprising a gamification configured to:

implement a multi-tiered level, where each of the multi-tiered level represents a range of wagering activities and purchase behaviors, wherein the multi-tiered level is designed to progressively challenge the user and encourage a wide range of wagering and purchasing activities;

introduce a plurality of challenges that are dynamically generated based on one or more wagering activities of the user, purchase history, and current level, wherein the plurality of challenges may involve one or more types of one or more wagers, one or more purchase orders, one or more social interactions, and one or more learning activities;

award one or more badges, one or more additional discounts, or one or more special offers to the user upon completion of one or more challenges from the plurality of challenges or reaching a specific level from any of the multi-tiered level, wherein the one or more badges, the one or more additional discounts, or the one or more special offers are personalized based on one or more preferences of the user;

create one or more leaderboards to rank a plurality of users based on one or more metrics, wherein the one or more metrics comprising a wagering success, a purchase activity, a challenge completion, a level progression, and one or more gamification points, wherein the one or more leaderboards may be filtered by one or more time periods, one or more geographical locations, or one or more user groups, providing a competitive and social element to the electronic sports wagering exchange system;

enable one or more users from the plurality of users to exchange the one or more gamification points for the one or more additional discounts, the one or more special offers, exclusive content, or other benefits within the electronic sports wagering exchange system, wherein the exchange rates and available options may be dynamically adjusted based on one or more objectives of the electronic sports wagering exchange system and an engagement level of the user; and utilize one or more machine learning algorithms to analyze a participation of the user, and continuously optimize the multi-tiered level, the plurality of challenges, the one or more badges, the one or more additional discounts, the one or more special offers, one or more leaderboards, and one or more exchange options.

12. The electronic sports wagering exchange system of claim 1, further comprising:

providing a Virtual Reality (VR) and Augmented Reality (AR) interface for the user to interact with the electronic sports wagering exchange system, place one or more wagers, and make one or more purchase orders, wherein the VR and AR interface may switch between one or more VR and AR modes based on one or more preference of the user or a context of the interaction;

simulate the predetermined event in real-time in the VR mode, allowing the user to experience the predetermined event virtually, wherein the simulation may comprise realistic 3D graphics, spatial audio, and haptic feedback to enhance immersion;

overlay real-time information about the wager and the plurality of products or services onto a physical environment of the user in the AR mode, wherein the information may be interactively manipulated and explored by the user;

enable the user to virtually explore the one or more products or services linked to the wager from the plurality of products or services in the VR mode and the AR mode, wherein the exploration may comprise one or more 3D models of each of the one or more products or virtual demonstrations of the one or more services;

provide a virtual marketplace in the VR mode where a plurality of users may interact with each other, discuss the one or more wagers, and share experiences, wherein the virtual marketplace may replicate social dynamics and spatial navigation of a physical marketplace; and enable the user to see and interact with the one or more wagers and the one or more purchase orders of other users in the AR mode, wherein the interaction may comprise liking, commenting, or sharing the one or more wagers and the one or more purchase orders.

13. The electronic sports wagering exchange system of claim 1, further comprising:

recording each of one or more wagers, each of one or more purchase orders, and one or more wager-based transactions on a decentralized blockchain ledger, wherein the decentralized blockchain ledger is maintained by one or more nodes in a peer-to-peer network;

utilize one or more cryptographic hash functions and one or more digital signatures to ensure transparency, immutability, and security of wagering and purchasing process, and wherein each of the one or more wager-based transactions is timestamped;

implement one or more smart contracts that automatically execute the outcome of the wager placed and apply the discount or coupon based on one or more predefined rules and real-time data from the predetermined event, wherein the one or more smart contracts are transparent, deterministic, and self-executing;

enable the user to verify the fairness of the outcome of the wager, an accuracy of the discount or coupon applied, and an integrity of entire process by inspecting the decentralized blockchain ledger and the one or more smart contracts, wherein the verification may be done using one or more blockchain explorers and one or more smart contract analysis tools;

provide a secure and trustless platform for the user to trade or sell the discount or coupon to other users, wherein the trade or sale of the discount or coupon is facilitated by the one or more smart contracts and recorded on the decentralized blockchain ledger, ensuring the security, transparency, and traceability of the one or more wager-based transactions; and utilize one or more machine learning algorithms to analyze a blockchain data, detect one or more fraudulent activities or market manipulations, and continuously optimize the one or more smart contracts and trading platform.

14. A computer-implemented method for facilitating a wager-based transaction for a plurality of products or services, comprising:

a processor; and a memory coupled to the processor, with instructions stored thereon that, when executed by the processor, cause the processor to perform operations comprising;

receiving a wager from a user for a predetermined event, wherein the predetermined event comprising a gaming activity, a gambling activity, a sporting event, or a financial market condition;

maintaining a pricing data and an availability data for each of the plurality of products or services offered by a plurality of merchants;

receiving a purchase order for one or more products or services from the plurality of products or services, wherein the purchase order is linked to the wager placed by the user;

determining an outcome of the wager as a winning bet or a losing bet;

adjusting a purchase price for the purchase order based on the outcome of the wager by:
  converting a potential payout of the wager into a discount or coupon applicable to the purchase order if the wager is the winning bet; and
  applying the discount or coupon to the purchase order to reduce the purchase price; and dynamically determining a value of the discount or coupon based on a plurality of evolving betting odds and the potential payout of the wager; and the computer-implemented method, further comprising risk management and mitigation, that is configured to:

fetch and analyze a comprehensive set of data associated with one or more wagering activities of the user, wherein the comprehensive set of data comprising but not limited to one or more types of the wager placed, the outcome of the wager placed, timing and frequency of the wager, correlation between one or more wagers and one or more purchases, and one or more responses of the user to one or more previous risk assessment reports;

utilize one or more machine learning algorithms to assess a risk level of the wager placed by the user based on the analysis of the comprehensive set of data, one or more current market conditions, and one or more real-time updates from one or more predetermined events, the risk level is continuously updated and refined as a new set of data is collected and analyzed;

generate one or more real-time risk assessment reports for the user, wherein the one or more real-time risk assessment reports comprising one or more detailed explanations and visualizations of the risk level, and one or more potential consequences of the wager, wherein the one or more real-time risk assessment reports are tailored to one or more betting and purchasing patterns, one or more preferences, and a risk tolerance of the user;

dynamically adjust the value of the discount or coupon offered to the user based on the risk level, one or more specifics of the wager, and a historical acceptance rate of one or more discounts or coupons of the user; and provide the user with one or more tools and resources to learn about risk management in wagering and purchasing, comprising educational content, interactive simulations, and personalized advice.

15. The computer-implemented method of claim 14, further comprising:
structuring the wager as a parlay comprising a plurality of betting conditions; and
providing a larger discount or coupon in response to more betting conditions of the parlay being met.

16. The computer-implemented method of claim 14, further comprising enabling the user to sell or trade the discount or coupon generated from the winning bet.

17. The computer-implemented method of claim 14, further comprising receiving preferences for applying discounts to the purchase order linked to the losing bet, and facilitating the application of the discounts to the losing bet based on the preferences of the plurality of merchants.

18. The computer-implemented method of claim 14, wherein receiving the wager comprises enabling the user to search, view, place, accept, change, or settle the wager in a database.

19. A non-transitory computer-readable medium with instructions stored thereon that, when executed by one or more computers, cause the one or more computers to perform operations, the operations comprising:

receiving a wager from a user for a predetermined event, wherein the predetermined event comprising a gaming activity, a gambling activity, a sporting event, or a financial market condition;

maintaining a pricing data and an availability data for each of a plurality of products or services offered by a plurality of merchants;

receiving a purchase order for one or more products or services from the plurality of products or services, wherein the purchase order is linked to the wager placed by the user;

determining an outcome of the wager as a winning bet or a losing bet;

adjusting a purchase price for the purchase order based on the outcome of the wager by:
  converting a potential payout of the wager into a discount or coupon applicable to the purchase order if the wager is the winning bet; and
  applying the discount or coupon to the purchase order to reduce the purchase price; and dynamically determining a value of the discount or coupon based on a plurality of evolving betting odds and the potential payout of the wager; and the non-transitory computer-readable medium, further comprising risk management and mitigation, that is configured to:

fetch and analyze a comprehensive set of data associated with one or more wagering activities of the user, wherein the comprehensive set of data comprising but not limited to one or more types of the wager placed, the outcome of the wager placed, timing and frequency of the wager, correlation between one or more wagers and one or more purchases, and one or more responses of the user to one or more previous risk assessment reports;

utilize one or more machine learning algorithms to assess a risk level of the wager placed by the user based on the analysis of the comprehensive set of data, one or more current market conditions, and one or more real-time updates from one or more predetermined events, the risk level is continuously updated and refined as a new set of data is collected and analyzed;

generate one or more real-time risk assessment reports for the user, wherein the one or more real-time risk assessment reports comprising one or more detailed explanations and visualizations of the risk level, and one or more potential consequences of the wager, wherein the one or more real-time risk assessment reports are tailored to one or more betting and purchasing patterns, one or more preferences, and a risk tolerance of the user;

dynamically adjust the value of the discount or coupon offered to the user based on the risk level, one or more specifics of the wager, and a historical acceptance rate of one or more discounts or coupons of the user; and provide the user with one or more tools and resources to learn about risk management in wagering and purchasing, comprising educational content, interactive simulations, and personalized advice.

\* \* \* \* \*